United States Patent
Frannhagen et al.

(10) Patent No.: US 6,819,686 B1
(45) Date of Patent: Nov. 16, 2004

(54) BACKPLANE PROTOCOL

(75) Inventors: Mats Frannhagen, Greenbrae, CA (US); Dirk Brandis, Novato, CA (US); Frank Marrone, Cloverdale, CA (US)

(73) Assignee: Turin Networks, Petaluma, CA (US)

( * ) Notice: Subject to any disclaimer, the term of this patent is extended or adjusted under 35 U.S.C. 154(b) by 565 days.

(21) Appl. No.: 09/745,982

(22) Filed: Dec. 22, 2000

(51) Int. Cl.[7] ............................. H04J 3/00; H04J 3/02
(52) U.S. Cl. ..................... 370/535; 370/463; 370/466; 370/352; 370/506
(58) Field of Search ............................. 370/463, 466, 370/352, 506, 535

(56) References Cited

U.S. PATENT DOCUMENTS

| | | | |
|---|---|---|---|
| 5,615,211 A | | 3/1997 | Santore et al. |
| 5,784,377 A | * | 7/1998 | Baydar et al. ............... 370/463 |
| 6,049,550 A | * | 4/2000 | Baydar et al. ............... 370/466 |
| 6,070,213 A | | 5/2000 | Giordano |
| 6,333,940 B1 | * | 12/2001 | Baydar et al. ............... 370/506 |
| 2001/0012288 A1 | * | 8/2001 | Yu ............................. 370/352 |
| 2002/0097743 A1 | * | 7/2002 | Baydar et al. ............... 370/463 |

* cited by examiner

*Primary Examiner*—Hassan Kizou
*Assistant Examiner*—Joe Logsdon
(74) *Attorney, Agent, or Firm*—Blakely, Sokoloff, Taylor & Zafman LLP

(57) ABSTRACT

A method and apparatus for transferring information in a communications system is described. In one embodiment, the method comprises creating a frame of information on a first line card and sending the frame over a backplane to a second line card using a serial link interconnect. The frame comprises first, second and third portions. The first portion includes information to process the second and third portions. The second portion has packet and time-division multiplexed (TDM) data in multiple channels. Each of the channels is allocable to packet data or TDM data. The third portion includes data placed into the frame to accommodate for differences in timing references between the line cards.

25 Claims, 5 Drawing Sheets

BACKPLANE PROTOCOL

FIELD OF THE INVENTION

The present invention relates to the field of data transport in a communications system; more particularly, the present invention relates to a backplane protocol to enable transport of time-division multiplexed data and block data (e.g., packet, cell, etc.) between cards in a telecommunications system.

BACKGROUND OF THE INVENTION

Data traffic can be categorized into two types: packet and time-division-multiplexed (TDM). TDM data requires deterministic transport and requires low delay. Packet data may require these characteristics as well, but in other instances can tolerate delay. The main difference between the way systems handle TDM data and packet data is that TDM bandwidth is reserved regardless of the presence of data, while packet data only requires bandwidth if a packet is present. If one packet is not present another packet can use the bandwidth.

In many current telecommunication systems, both TDM data and packet data are often transferred between line cards. The line cards are coupled together using one or more interconnects or switch fabrics. Such existing systems require the addition of an additional interconnect and/or separate switch fabrics to accommodate both packet and TDM data traffic. Providing separate data paths to each type of traffic requires additional expense. The additional expense is doubled if redundant fabrics are required for fault protection, which is typically necessary in prior art systems.

Switches typically require some sort of control channel between elements within the switch. These communication channels are used in the inner workings of the switch and are usually transparent to the user. Many prior art systems require control channels that are managed and provisioned separately. This implies that extra backplane, hardware, and software resources are needed, thereby requiring higher system cost and power.

Packet switches usually require that packets be broken up into smaller blocks as they pass through the switch fabric. These blocks are typically of a fixed size. This results in throughput inefficiencies for packets which are slightly larger than a multiple of this fixed block size. To avoid this problem of throughput inefficiencies, prior art systems run the switch fabric at up to twice the required speed. This results in wasted bandwidth, higher power, and cost.

A typical centralized, switch fabric approach also makes incremental protocol upgrade difficult since all traffic passes through a central point. Any protocol change must take into account the limitations of this central fabric. A protocol upgrade in such systems often requires a change-out of all cards in the system.

When backplanes are used, the links in the backplane are clocked using a timing reference. Prior art systems might use the network reference for the backplane links. This makes it hard to implement more than one timing domain in a network box, and it also requires more complicated timing logic for changing references.

SUMMARY OF THE INVENTION

A method and apparatus for transferring information in a communications system is described. In one embodiment, the method comprises creating a frame of information on a first line card and sending the frame over a backplane to a second line card using a serial link interconnect. The frame comprises first, second and third portions. The first portion includes information to process the second and third portions. The second portion has packet and time-division multiplexed (TDM) data in multiple channels. Each of the channels is allocable to packet data or TDM data. The third portion includes data placed into the frame to accommodate for differences in timing references between the line cards.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
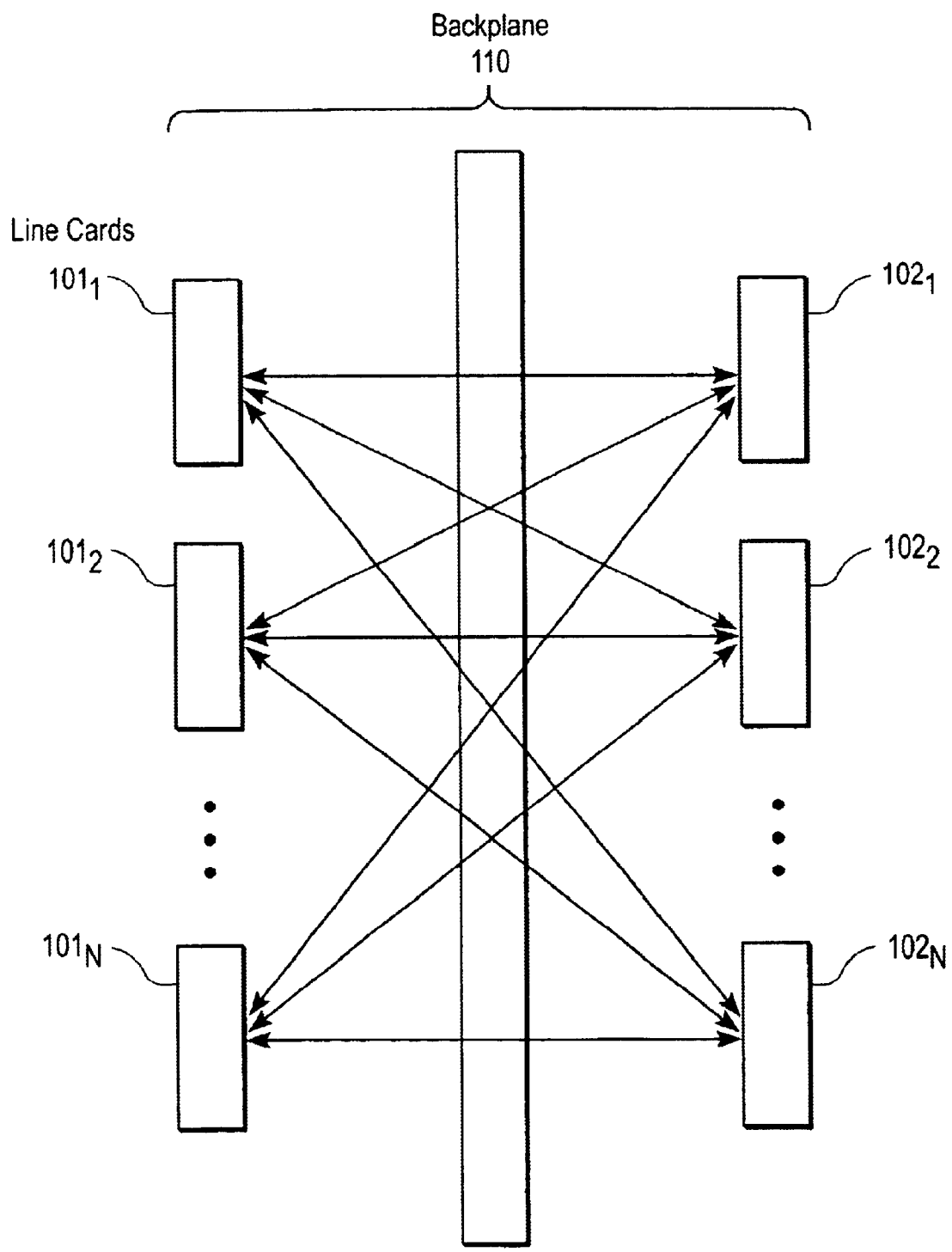
FIG. 1 illustrates one embodiment of a network.

A method and apparatus for transferring information in a communications system is described. In one embodiment, the method comprises creating a frame of information on a first line card and sending the frame over a backplane to a second line card using a serial link interconnect. The frame comprises first, second and third portions. The first portion includes information to process the second and third portions. The second portion has packet and time-division multiplexed (TDM) data in multiple channels. Each of the channels is allocable to packet data or TDM data. The third portion includes data placed into the frame to accommodate for differences in timing references between the line cards.

In the following description, numerous details are set forth, in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc. Such a medium may also be implemented in application specific integrated circuits (ASICs) or field programmable gate arrays (FPGAs).

Overview

A network box or system, that implements the functionality of one or more of a switch, ADM, crossconnect (e.g., TDM) is described. In one embodiment, the network box utilizes a full mesh backplane that provides a serial link interconnect between each line card in the system with every other line card in the system. FIG. 1 illustrates one embodiment of a network box. Referring to FIG. 1, line cards $101_1$–$101_N$ are shown coupled to line cards $102_1$–$102_N$ via backplane 110. Backplane 110 comprises a full mesh interconnect in which each of line cards $101$–$101_N$ has a dedicated connection to each of line cards $102$–$102_N$. Note that line cards $101_1$–$101_N$ and line cards $102_1$–$102_N$ are shown arranged with respect to both sides of backplane 110; however, such cards are typically positioned in a cabinet side by side connected to backplane 110 along the same edge of each card. One embodiment of the backplane is described in more detail in U.S. patent application Ser. No. 09/746,212, entitled "A Full Mesh Interconnect Backplane Architecture," filed concurrently herewith on Dec. 22, 2000, which is now U.S. Pat. No. 6,754,757 and assigned to the corporate assignee of the present invention.

A backplane protocol is used by transceivers on the line cards to transport data and control information between each other over the full mesh interconnect. The backplane protocol described herein accommodates both TDM and block, or packet, data traffic types so that the fully meshed interconnect operates as a packet and TDM switch fabric using the same set of high speed links.

In one embodiment, the protocol described provides a mechanism whereby control channels between elements within a switch can be implemented in an integrated manner within the same link used for data. The presence of these control channels combined with the fully meshed interconnect allows for the implementation of a distributed switch architecture.

In one embodiment, the protocol allows for variable sized packets on the backplane links. This allows the links to maintain full throughput regardless of the arriving packet sizes and under-utilization if the backplane link will be avoided. In one embodiment, the protocol also allows the backplane links to be clocked independently from any of the timing references used on the interfaces out of the network box. This is accomplished by transferring data on the link that is marked as "don't care". This data is referred to herein as stuffing. The receiver throws away, or ignores, that data, and thus, the receiver in avoiding processing that data can use that time to accommodate for differences in the timing references of the transmitter on one card and the receiver on the other.

In one embodiment, the protocol described herein allows for integrating incremented protocol upgrades. New line cards may utilize new versions of the backplane protocol. These new cards may be designed to support older versions of the protocol as well. In one embodiment, backplane links to/from older cards use an older version of the protocol, while links to/from new cards use the new version. In this fashion, new types of cards can be introduced into network boxes without having to remove older cards.

An Exemplary Data Structure

Figure 2:
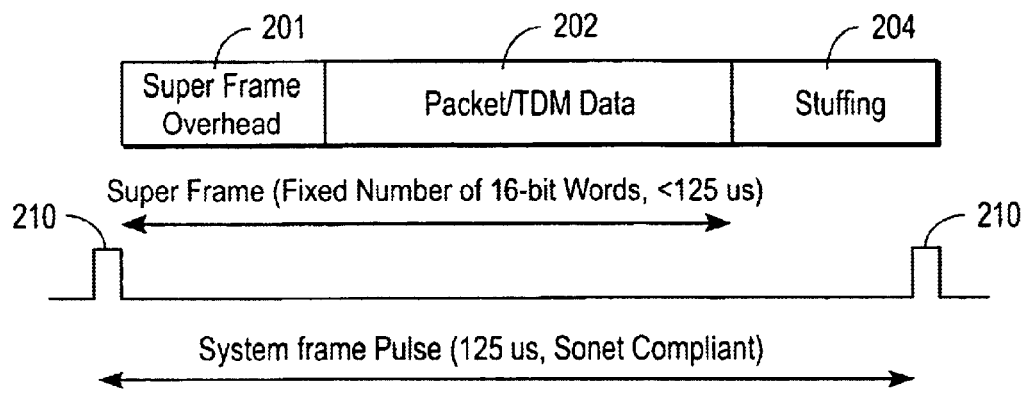
FIG. 2 illustrates one embodiment of a super frame data structure to send data over backplane links.

FIG. 2 illustrates one embodiment of a frame data structure to send data over backplane links. Referring to FIG. 2, the data structure comprises a frame overhead 201, packet/TDM data 202, and stuffing 204. In one embodiment, each of frame overhead 201 and packet/TDM data 202 of the frame comprises a fixed number of 16-bit words. A line card splits the data transported into 16-bit words and collects a number of such words into the frame structure.

Stuffing 204 follows the frame to accommodate for frequency differences between the system frame pulse and the backplane reference clock as well as for frequency differences between the backplane reference clocks of two cards if not the same.

In one embodiment, the frame is sent over the backplane links as a 125us structure with stuffing 204 at the end. The super frame and stuffing 204 have a duration of a system frame pulse. In one embodiment, transmission of the packet started with a system wide 8 kHz SONET compliant pulse 210. That is, frame pulse 210 is derived from a SONET compliant clock.

Super Frame Overhead

In one embodiment, the super frame overhead has the following functions: framing synchronization; bit/byte/word synchronization; checksum for link performance monitoring; provide packet pointer (start of new packet); data channels for card-to-card communication. In another embodiment, the super frame overhead also functions to distribute TDM/cell allocation information.

Figure 3:
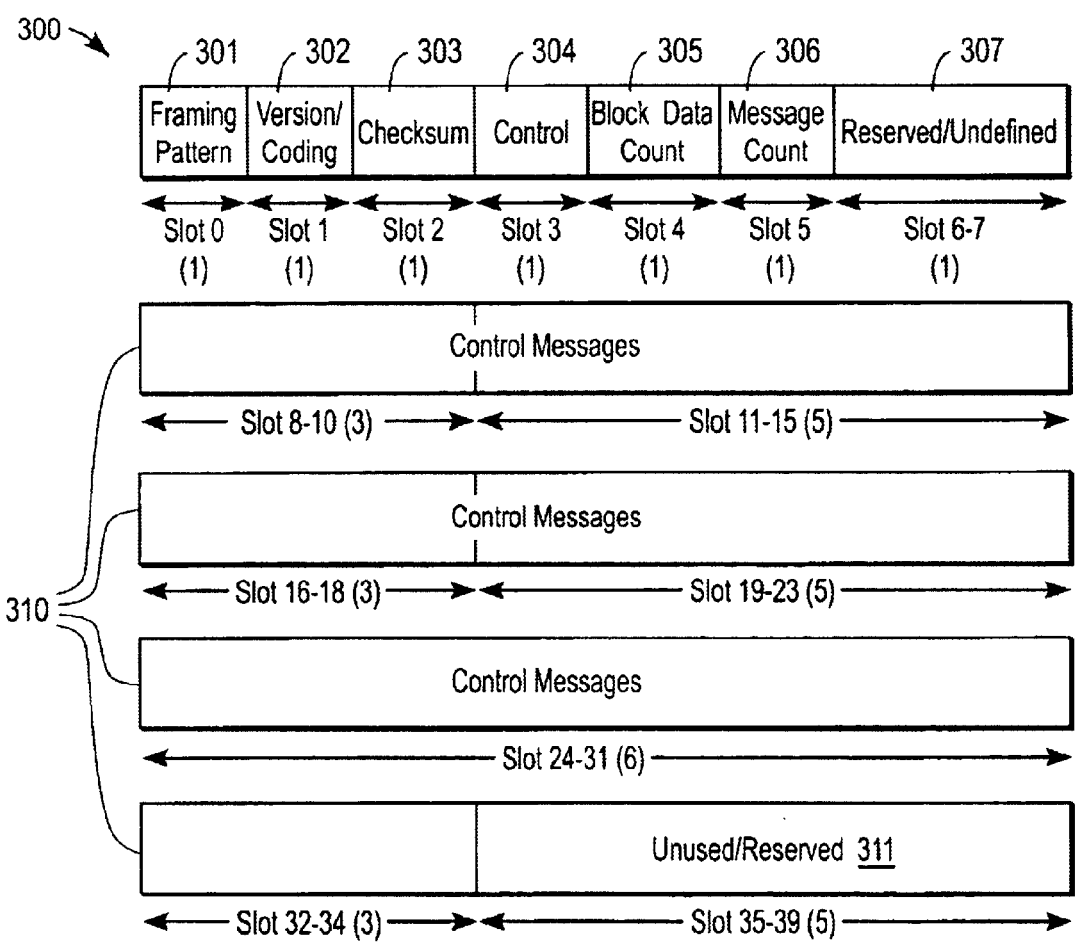
FIG. 3 illustrates one embodiment of the overhead portion of a super frame including control messages.

FIG. 3 illustrates one embodiment of the overhead of the frame of FIG. 2. Referring to FIG. 3, frame 300 includes framing pattern slot 301, version/coding slot 302, checksum slot 303, control slot 304, block data pointer slot 304, message count slot 306, and a reserve/undefined slot 307, followed by a number of slots for control messages 310 and a number of slots 311 that are reserved or unused.

The information in framing pattern slot 301 is used by the receiver on the line card to locate the start of the frame and to align the bytes and/or words. In one embodiment, the frame is started a fixed delay after a system pulse (e.g., 8 KHz). Therefore, the receiver knows approximately when to look for the pattern.

Version/coding slot 302 contains version control information. In one embodiment, version control information enables changes in the frame structure with respect to backward compatibility. For example, newer versions always support older formats. Once the version information is received by a receiver, the receiver may use the proper coding or scrambling that is associated with that version.

Checksum slot 303 contains the check sum that is used for performance monitoring of the link.

Control slot 304 contains control related information. In one embodiment, control slot 304 provides locations for TDM/block data allocation bits that allow for performing synchronization procedures when changing the allocation between TDM and packet data on a backplane link. In one embodiment, the new allocation is filled in by both egress and ingress cards before writing an update bit on the ingress card. When the update bit is written on the ingress card, the next frame uses the new allocation and a synchronization message is sent.

Block data pointer slot 305 contains a pointer to the start of a new block data in the frame. This pointer is included because it can not be assumed that the last block data in the last super frame was transmitted in full. By having the pointer, the start of a first new block data in each frame can be located.

Message count slot 306 contains information indicative of the number of control messages that are valid in the current super frame.

The reserve/undefined slots 307 are currently designated for future use; however, in another embodiment they may be used for a variety of functions. The same is true of the unused/reserved slots 311.

Control message slots 310 provide transport for low latency control channels for controls, such as, but not limited to, flow control, protection switching control data, etc.

Packet/TDM Data

The second portion of the frame is for transporting the packets and TDM data. In one embodiment, the packet/TDM portion consists of a number of channels, each carrying a STS-1 rate signal (approximately 52 Mbits/s). The number of channels depends on the speed used for the backplane link (i.e., link speed). For instance, a 3.125 Gbits/s link speed gives approximately 60 channels, or slots. For 60 channels, each of the channels can be allocated to either TDM data, packet data, or control data. In one embodiment, there are 6 channels dedicated to packet data, 6 channels dedicated to packet control data and 48 channels dedicated to packet and/or TDM data in each frame. Other allocations are possible, including those due to having less than 60 channels.

Figure 4:
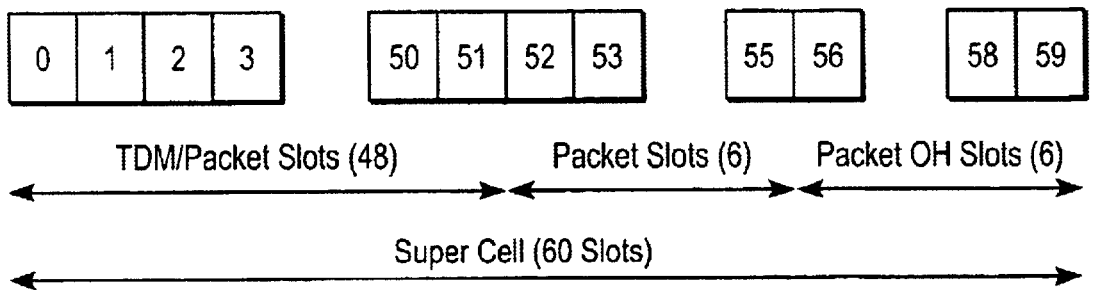
FIG. 4 illustrates an example of a super cell structure.

In one embodiment, to keep the latency low, the channels are interleaved on a 16-bit level, with 16-bits from each channel forming a "super cell". FIG. 4 illustrates an example of a super cell structure. Referring to FIG. 4, supercell 400 comprises 48 slots for TDM/packet data, 6 slots dedicated to packet data, and 6 slots dedicated for overhead. In one embodiment, each slot not allocated to TDM or overhead is allocated to packet data.

Figure 5:
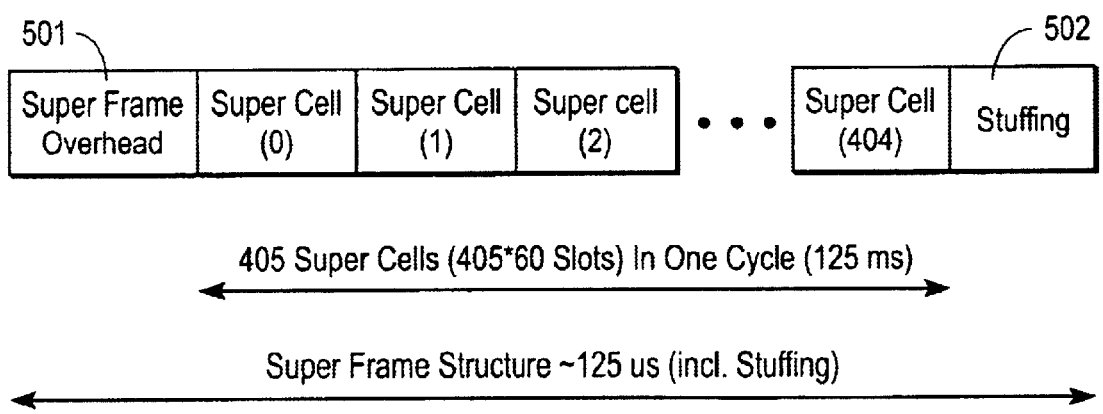
FIG. 5 illustrates one embodiment of super cell packing.

In one embodiment, there are 405 supercells in each frame structure, or in one cycle. FIG. 5 illustrates one embodiment of super cell packing. Referring to FIG. 5, frame overhead 501 is followed by supercells 0–404, which is followed by stuffing 502. The supercells, supercell(0)–supercell (404), are placed one after another to fill a frame. In one embodiment, the super cells are put one after another until 810 bytes are put in each channel (to match the STS-1 rate).

Although there are 405 super cells, the channels may change to compensate for changes in the link speed over the interconnect. In other words, the number of channels may change while the number of super cells remains the same. Thus, for any one channel the latency and throughput stay the same regardless of the number of channels.

Stuffing

The stuffing in the end of the super frame structure allows for adjusting the super frame rate to match the TDM data rate, i.e., 125 us period, over long periods. The stuffing words also make it possible to terminate the received clock domain very quickly, which is critical for an FPGA implementation. The stuffing accounts for slight variations in the clocks between the transmit and receive domains. This is because the stuffing is not received for processing. Therefore, if the processing rate on the receive card is slower than the data is being sent, the fact that the stuffing is not processed allows time for a slower receive card to process the data without incurring errors due to the small amount of difference in the clock speeds in the transmit and receive domains. In essence, this enables the format to be independent of the clock.

In one embodiment, the first word of the overhead is selected so that a single bit error in the stuffing does not result in the two being the same. Therefore, if an error occurs in the stuffing, a line card will not confuse the stuffing with the start of a super frame.

Figure 6:
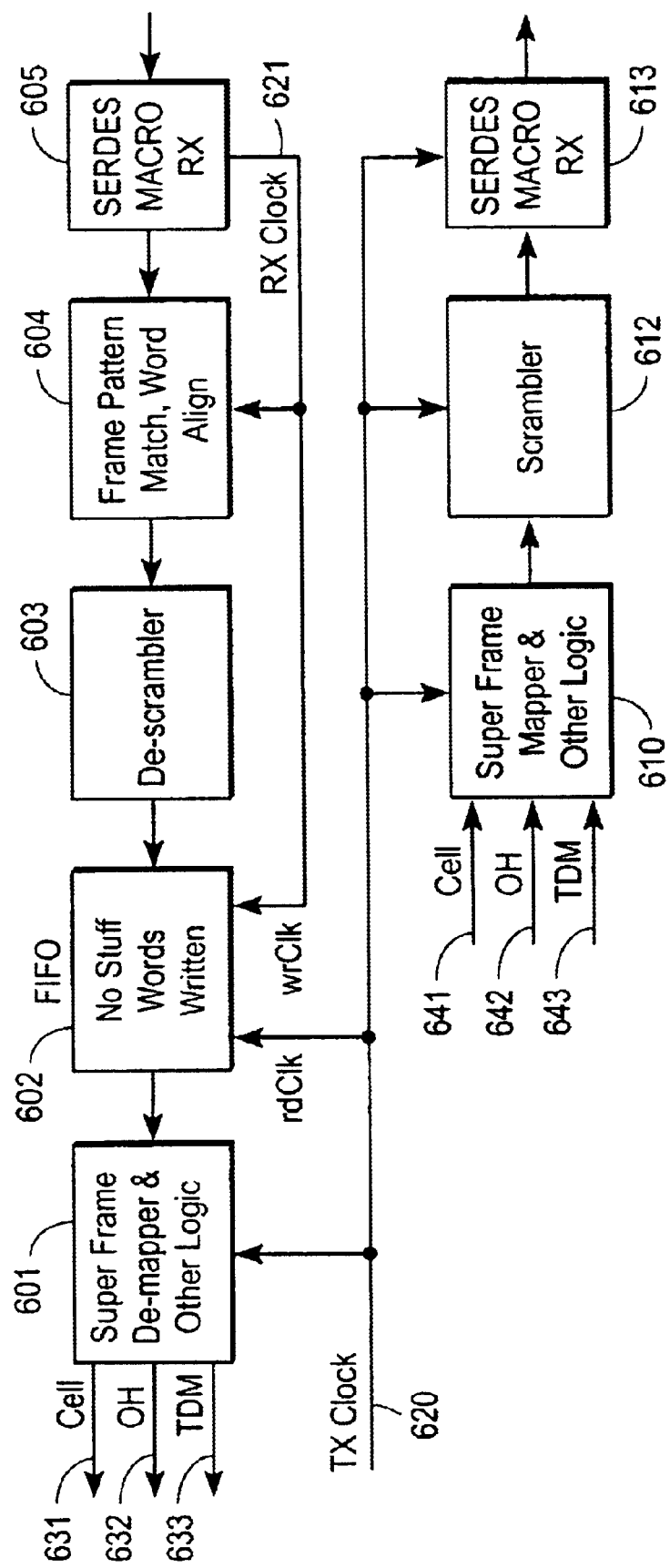
FIG. 6 illustrates early termination of the received clock domain.

FIG. 6 is a block diagram of one embodiment of an interface on a line card to send and receive information. Referring to FIG. 6, receiver 605 receives frames in the form of a bit stream from another line card via a link on the backplane. The data is clocked-in using a receiver (Rx) clock 621. The clocked-in data is forwarded to frame pattern matching block 604 that performs frame pattern matching and word alignment on the received bit stream in a manner well-known in the art. After frame pattern matching and word alignment, descrambler 603 performs descrambling in a manner well-known in the art, and stores the descrambled data into FIFO 602 using Rx clock 621 as a write clock. In one embodiment, descrambler 603 performs 2-stage synchronous descrambling, including performing scrambling according to SONET scrambling $1+x^6+x^7$ and performing the scrambling according to the following equation: $(1+x^{43})$. No stuffing words are written into FIF0 602. Demapper 601 reads data from FIF0 602 according to a read clock and performs a demapping (e.g., sorting) operation to produce a cell data stream 631, an overhead data stream 632, and a TDM data stream 633. In one embodiment, the read clock comprises the transmit (Tx) clock 620 used for sending frames and is the clock for demapper 601.

For transmission, mapper 611 receives a cell data stream 641, an overhead stream 642 and a TDM data stream 643 and combines them into a single data stream. Scrambler 612 receives the stream of frames and scrambles them. In one embodiment, scrambler 612 performs a 2-stage frame synchronous scrambling. The scrambled frames are sent and transmitted by transmitter 613. Each of frame mapper 611, scrambler 612, and transmitter 613 are coupled to receive, and operate based upon, at least in part, Tx clock 620.

In one embodiment, the stuffing is done at a 16-bit word level resulting in jitter in the TDM data. However, this jitter will be removed after a buffer (coupled to the TDM output of a demapper) that takes the data into the "telecom" clock domain. By stuffing with 16-bits, the bit/byte/word alignment does not have to be redone after it is found.

Figure 7:
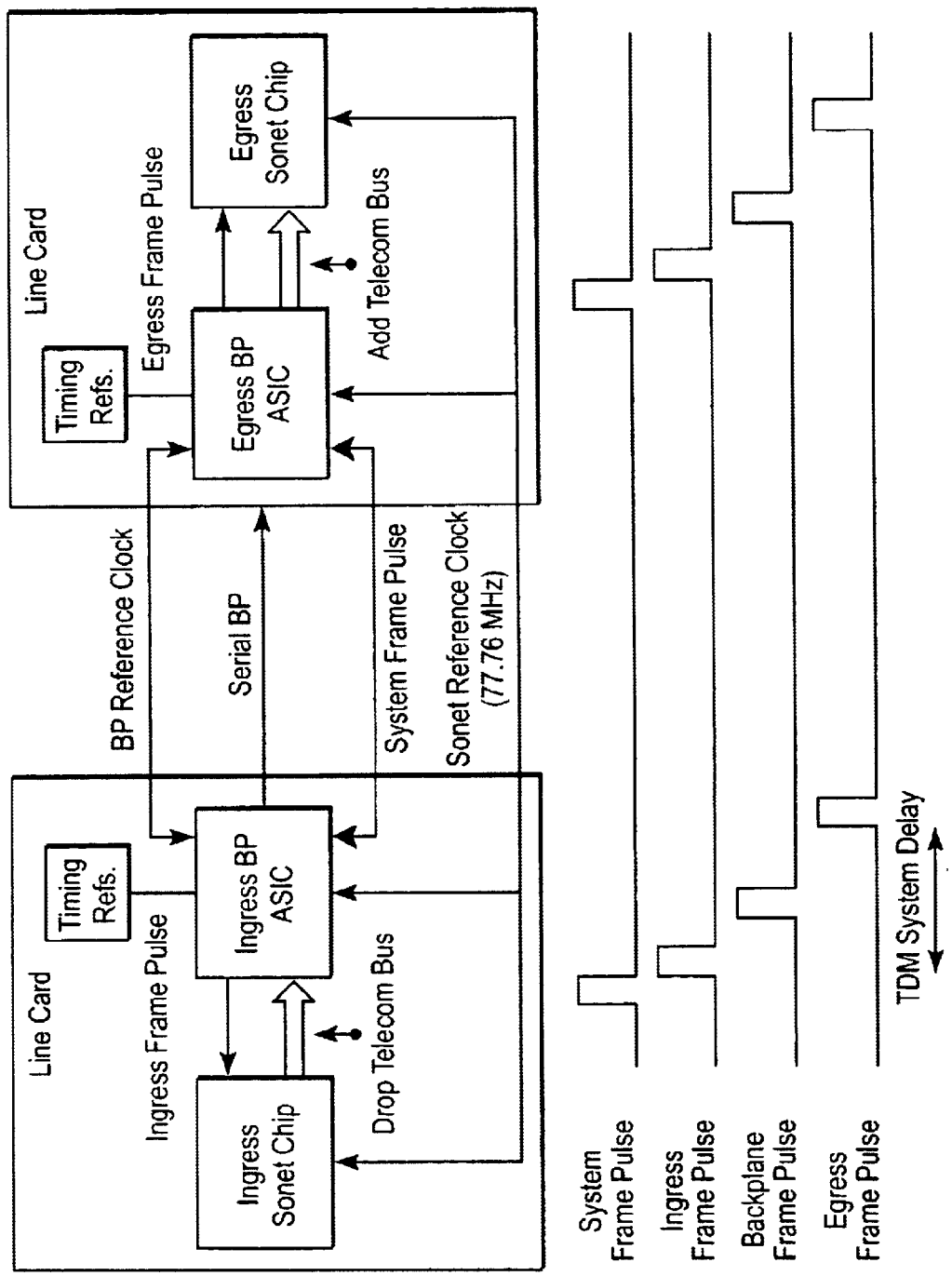
FIG. 7 illustrates two SONET chips connected via their telecommunications buses through the backplane.

FIG. 7 illustrates two SONET chips connected via their telecom buses through a backplane. For simplicity, data is shown only going in one direction. Therefore, reference to ingress and egress given in the following example are not indicative of the sole function of a device and may be switched when the data direction is revised.

Referring to FIG. 7, both backplane ASICs are coupled to receive the system frame pulse. This pulse is used both for super frame synchronization on the backplane and for the frame pulse indications to the SONET chips. As shown in FIG. 7, the first pulse to be generated (from the system frame pulse) is the ingress SONET frame pulse. This pulse causes SONET chip 701 to output the start of the SONET frame (first byte after J0) on the drop telecom bus 711. This data is put into small FIF0s (not shown) inside ASIC 702. At the start of the backplane framing pulse, the super frame is sent out and, at the first TDM slot, data is read out from the TDM ingress FIF0s.

On the egress side, the backplane ASIC 703 receives the start of the super frame and soon thereafter obtains TDM data. This data is again put into small FIF0s in ASIC 703.

Some time after the backplane frame pulse, backplane ASIC 703 generates an egress frame pulse to egress SONET chip 704. At this time the TDM data is available in the egress FIF0s and can be placed on the add telecom bus 712.

Ingress SONET chip 701 adjusts and outputs the SPE pointers (as defined in SONET standard) according to the frame pulse. Egress SONET chip 704 only needs the frame pulse marker and then performs "normal" SONET pointer processing.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

creating a frame of information on a first line card; and sending the frame over a backplane to a second line card using a serial link interconnect;

wherein the frame comprises first, second and third portions, the first portion containing information to process the second and third portions, the second portion having packets and time-division multiplexed (TDM) data in a plurality of channels, wherein each of the plurality of channels is allocatable to packet data or TDM data, and the third portion including data placed into the frame to accommodate for differences in timing references between the first and second line cards.

2. The method defined in claim 1 wherein each of the plurality of channels is allocated to packet data, TDM data or control data.

3. The method defined in claim 2 wherein clocking information is embedded in signals transferred over the serial link interconnect.

4. The method defined in claim 1 wherein one or more channels are dedicated to packet data.

5. The method defined in claim 1 wherein the first portion includes a pattern known to the second line card, and further wherein the pattern and third portion are such that a single bit error in the third portion does not cause the pattern to be identical to any part of a first word of the first portion.

6. The method defined in claim 1 wherein the second portion comprises a plurality of regions, each of the plurality of regions having channels.

7. The method defined in claim 6 wherein the plurality of regions comprises 405 cells.

8. The method defined in claim 7 wherein all of the 405 cells has 60 channels.

9. The method defined in claim 1 wherein size of the third portion is variable from frame to frame.

10. The method defined in claim 1 wherein link speed is dependent on the number of channels.

11. The method defined in claim 1 wherein each of the channels carries a STS-1 rate signal.

12. The method defined in claim 1 wherein frame rate of the frame is SONET compliant.

13. A network comprising:

a first line card;

a second line card;

a backplane coupling to first and second line cards using a serial link interconnect between the first and second line cards, wherein each of the first and second line cards comprises at least one transceiver to exchange data and control information with each other using frames, wherein each frame comprises first, second, and third portions, the first portion containing information to process the second and third portions, the second portion having packets and time-division multiplexed (TDM) data in a plurality of channels, wherein each of the plurality of channels is allocatable to packet data or TDM data, and the third portion including data placed into the frame to accommodate for differences in timing references between the first and second line cards.

14. The network defined in claim 13 wherein each of the plurality of channels is allocated to packet data, TDM data or control data.

15. The network defined in claim 14 wherein clock information is embedded in signals transferred over the serial link interconnect.

16. The network defined in claim 13 wherein one or more channels are dedicated to packet data.

17. The network defined in claim 13 wherein the first portion includes a pattern known to the second line card, and further wherein the pattern and third portion are such that a single bit error in the third portion does not cause the pattern to be identical to any part of a first word of the first portion.

18. The network defined in claim 13 wherein the second portion comprises a plurality of regions, each of the plurality of regions having channels.

19. The network defined in claim 18 wherein the plurality of regions comprises 405 cells.

20. The method defined in claim 18 wherein all of the 405 cells has 60 channels.

21. The network defined in claim 13 wherein size of the third portion is variable from frame to frame.

22. The network defined in claim 13 wherein link speed is dependent on the number of channels.

23. The network defined in claim 13 wherein each of the channels carries a STS-1 rate signal.

24. The network defined in claim 13 wherein frame rate of the frame is SONET compliant.

25. A network box comprising:
- a card;
- a serial link interconnect backplane coupled to the card;
- the card to send a frame over the backplane, the frame having a first and second portions,
- the first portion having packets and time-division multiplexed (TDM) data in a plurality of channels, wherein each of the plurality of channels is allocatable to packet data or TDM data, and
- the second portion including data placed into the frame to accommodate for differences in timing references between the card and another card.

* * * * *